United States Patent
Brown

(10) Patent No.: US 9,762,892 B2
(45) Date of Patent: Sep. 12, 2017

(54) AUTO-MULTISCOPIC 3D DISPLAY AND CAMERA SYSTEM

(71) Applicant: Kedrick F. Brown, Houston, TX (US)

(72) Inventor: Kedrick F. Brown, Houston, TX (US)

(73) Assignee: LIGHTSCOPE MEDIA, LLC, Houston, TX (US)

( * ) Notice: Subject to any disclaimer, the term of this patent is extended or adjusted under 35 U.S.C. 154(b) by 0 days.

(21) Appl. No.: 15/375,093

(22) Filed: Dec. 11, 2016

(65) Prior Publication Data

US 2017/0127043 A1    May 4, 2017

(51) Int. Cl.
| | |
|---|---|
| *H04N 13/02* | (2006.01) |
| *H04N 13/04* | (2006.01) |
| *G02B 17/00* | (2006.01) |
| *G02B 27/22* | (2006.01) |
| *H04N 5/374* | (2011.01) |
| *H04N 5/372* | (2011.01) |

(52) U.S. Cl.
CPC ....... *H04N 13/0225* (2013.01); *G02B 17/002* (2013.01); *G02B 27/2235* (2013.01); *H04N 13/0409* (2013.01); *H04N 5/372* (2013.01); *H04N 5/374* (2013.01)

(58) Field of Classification Search
CPC .......... H04N 13/0409; H04N 13/0415; H04N 27/2235; H04N 27/2242; H04N 17/002; H04N 5/372; H04N 5/374; H04N 13/0228; H04N 13/0459; H04N 13/0404; H04N 1/00201; H04N 13/0475; H04N 13/0447; H04N 13/0495; H04N 13/0418; H04N 13/0413; G02B 27/2214; G02B 27/22; G03B 37/04; G03B 35/24
See application file for complete search history.

(56) References Cited

U.S. PATENT DOCUMENTS

| | | |
|---|---|---|
| 3,704,055 A | 11/1972 | Hong |
| 6,189,246 B1 | 2/2001 | Gorthala |
| (Continued) | | |

OTHER PUBLICATIONS

"3D/2D Convertible Projection-Type Integral Imaging Using Concave Half Mirror Array" Hong et al., Optics Express 20628 © 2010 OSA.*

(Continued)

*Primary Examiner* — Dramos I Kalapodas
(74) *Attorney, Agent, or Firm* — Louis Ventre, Jr.

(57) ABSTRACT

An apparatus for displaying and/or capturing auto-multiscopic 3D images includes a concave mirror array; a parallax barrier with an inner wall, an opaque outer wall and an array of first transparent spots or lines extending through the parallax barrier; and a membrane between the opaque outer wall and the concave mirror array. The membrane is capable of displaying an intrinsic image when illuminated, sensing an image projected onto it, displaying an image projected onto it, and/or emitting light. The membrane includes a second transparent spot or line atop each first transparent spot or line respectively. A light source may illuminate the membrane and/or project an image onto the membrane. The reflective concave surface also may be configured to permit some light to pass through it and when so configured a second transparent solid and/or an image sensor may be placed behind the concave mirror array.

14 Claims, 12 Drawing Sheets

(56) References Cited

U.S. PATENT DOCUMENTS

| | | | |
|---|---|---|---|
| 6,724,536 B2 | 4/2004 | Magee | |
| 6,837,585 B2* | 1/2005 | Roggatz | G02B 27/2214 353/7 |
| 7,136,031 B2* | 11/2006 | Lee | G02B 27/22 345/31 |
| 7,483,215 B2 | 1/2009 | Raymond | |
| 7,525,541 B2* | 4/2009 | Chun | H04N 13/0003 345/108 |
| 7,573,491 B2 | 8/2009 | Hartkop et al. | |
| 7,752,792 B2 | 7/2010 | Hsieh et al. | |
| 7,843,449 B2 | 11/2010 | Krah | |
| 7,859,750 B2 | 12/2010 | Akiyama | |
| 7,978,407 B1 | 7/2011 | Connor | |
| 8,427,528 B2* | 4/2013 | Saishu | H04N 13/0404 348/46 |
| 8,749,722 B2* | 6/2014 | Uehara | G02B 3/0025 349/112 |
| 8,823,641 B2 | 9/2014 | Kuhlman et al. | |
| 9,146,403 B2 | 9/2015 | Lanman et al. | |
| 2004/0001139 A1* | 1/2004 | Kobayashi | G02B 27/2214 348/59 |
| 2008/0144174 A1 | 6/2008 | Lucente et al. | |
| 2009/0071050 A1 | 3/2009 | Hines | |
| 2010/0283838 A1 | 11/2010 | Tomisawa et al. | |
| 2013/0082905 A1* | 4/2013 | Ranieri | H04N 13/0409 345/32 |
| 2013/0286053 A1 | 10/2013 | Fleck et al. | |
| 2013/0321776 A1 | 12/2013 | Loong | |
| 2014/0003762 A1 | 1/2014 | Macnamara | |
| 2014/0362314 A1 | 12/2014 | Guo et al. | |
| 2015/0293358 A1 | 10/2015 | de Matos Pereira Viera et al. | |
| 2016/0048018 A1 | 2/2016 | de Matos Pereira Viera et al. | |
| 2016/0077336 A1 | 3/2016 | Hainich | |

OTHER PUBLICATIONS

Guo-Jiao LV, et al., Reflected-light-source-based three-dimensional display with high brightness, Applied Optics, Journal 2016 Optical Society of America, 1559-128X/16/133452-04, Apr. 22, 2016, pp. 3452-3455, USA.

Jisoo Hong, et al., "3D/2D convertible projection-type integral imaging using concave half mirror array," Optical Society of America, Sep. 27, 2010 / vol. 18, No. 20 / Optics Express 20628, US.

Rolf R. Hainich, Approaches to Ideal Freeform Mirror and Display Shapes for Augmented Reality, Freeform Mirrors and Displays for AR Preprint (version 1.0, Oct. 2016), online at http://www.theendofhardware.com/Freeform-NED-displays-RRH-preprint-v1-0.pdf, p. 8, Fig.9, USA.

* cited by examiner

EXAMPLE 2: CONCAVE MIRROR ARRAY CAMERA
1301

1302
Surface 1:
Concave Mirror Array (with Reflecting Concave Surfaces)

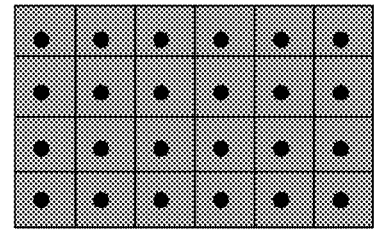

1303
Surface 2:
Image Sensing Membrane Facing the Reflective Surface of the Concave Mirror Array

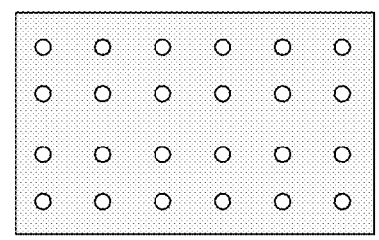

1304
Surface 3:
Parallax Barrier with Pinhole Array Facing a Scene

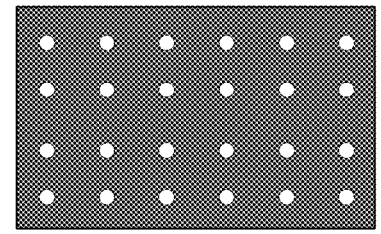

1305
Ambient Light enters Surface 3 through Pinholes and is reflected off Surface 1 onto Surface 2 (camera shutter not shown)

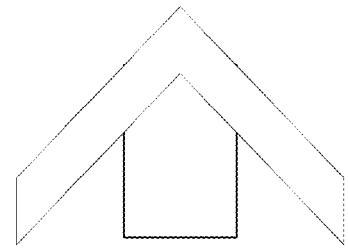

FIG.13

| LS1: Display with a colored image sheet that does not emit light on its own  1401 | LS2: Display used as a multi-directional white backlight for a colored image sheet  1404 |
|---|---|

Concave Mirror Array

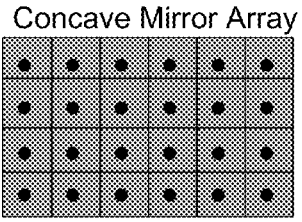

Membrane (LCD panel, film transparency sheet or printed image on a surface, with an array of clear spots to let light, reflected off the reflective concave surface, exit the display)

Pinhole array parallax barrier (LCD, metal, plastic, paint, etc.)

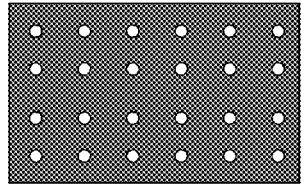

White light source (not shown)
Candidates include, but are not limited to:
1. LED edge lighting of display interior
2. Back-lighting of the concave mirror array if it permits light to pass through it
3. A white light source inside the parallax barrier that emits light towards the concave mirror array (provided that the image sheet is translucent)

Concave Mirror Array

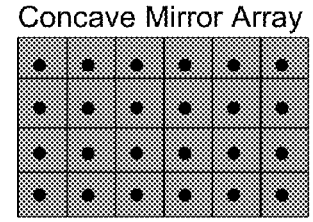

Membrane (Transparent OLED display that emits white light with an array of clear spots)

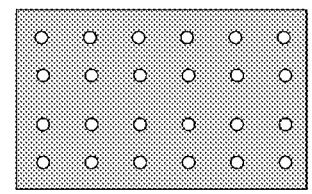

Pinhole array parallax barrier (LCD, metal, plastic, paint, etc.)

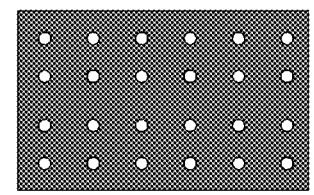

Colored image sheet located in front of display's parallax barrier (LCD panel or film transparency sheet)

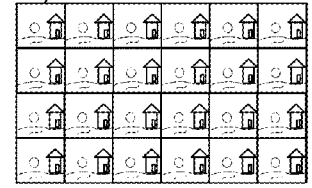

FIG.14

# AUTO-MULTISCOPIC 3D DISPLAY AND CAMERA SYSTEM

TECHNICAL FIELD

In the optical field, a system operating on light to capture images or produce a three-dimensional display. The system utilizing a transparent spot array parallax barrier or a transparent line array parallax barrier and a concave mirror array specially adapted to project light onto an image capture layer within the system or into the space in front of the three-dimensional display.

BACKGROUND ART

This invention provides improvements over the inventor's two earlier inventions: a first involving an auto-multiscopic 3D billboard display system and a second involving an auto-multiscopic 3D display system.

The first invention is described in U.S. patent application Ser. No. 15/084,221, filed 29 Mar. 2016, now U.S. Pat. No. 9,411,167 (the '167 patent), issued 9 Aug. 2016: This application and the '167 patent are hereby incorporated by reference herein in their entirety. This patent is for a billboard display system that utilizes a light source housed in a box-like structure. The light source shines light away from a non-transparent front wall and through a transparent rear wall and thence through a sheet of projection film having an array of images thereon and thence is reflected by a corresponding array of concave mirrors back to corresponding apertures. The apertures are formed at the bottom of indentations, preferably cone-shaped throughout the area of the front wall. The light passes through the apertures and thence out of the indentations to create a 3D image in the eyes of a viewer looking at the front wall.

The second invention is described in U.S. patent application Ser. No. 15/167,489, filed 27 May 2016, now U.S. Pat. No. 9,491,444 (the '444 patent) on 8 Nov. 2016: This application and the '444 patent are hereby incorporated by reference herein in their entirety. This application teaches an auto-multiscopic 3D display system utilizing one or more transparent organic light emitting diode (OLED) displays and Liquid Crystal Displays (LCDs) to enable full motion 3D displays. This display system is expected to display dynamic 3D images on flat screen televisions, monitors, tablets, smartphones, and other electronic display devices without any need for 3D enabling glasses. The term auto-multiscopic is used to define a display that allows multiple viewers to view three-dimensional scenes on a display, simultaneously and without the need for 3D glasses.

The present invention teaches improvements to the systems described in the '167 patent and the '444 patent in order to provide a device operable as a 3D display and a camera.

SUMMARY OF INVENTION

An apparatus is disclosed that can display auto-multiscopic 3D images or capture images that can be displayed on an auto-multiscopic 3D display. It includes a concave mirror array facing the inside wall of a parallax barrier. Each concave mirror in the array has a focal point or a focal line that resides on a pinhole or slit in the parallax barrier. Each pinhole or slit is referred to as a transparent spot or transparent line, respectively. The apparatus further includes a membrane between the outside wall of the parallax barrier and the concave mirror array. The membrane is capable of displaying an image when illuminated by light and/or sensing an image that is projected onto it. The membrane has an array of transparent spots or lines atop the pinholes or slits in the parallax barrier.

The apparatus may include a light source capable of illuminating the membrane and/or projecting an image onto the membrane. Each concave mirror in the array may also allow some light to pass through its reflective concave surface. When so configured, a second transparent solid may be situated on the convex side of the array (at a fixed orientation relative to the array) for use as a spacer, or so that light passing through it may be captured with a sensor located in (or adjoining to, or at a fixed distance from) the second transparent solid. Alternately, when so configured, a second transparent solid may be configured as a concave lens array. In each of these cases, the second transparent solid is situated on the convex side of the array (at a fixed orientation relative to the array). When configured as a concave lens array, the second transparent solid alters the trajectories of light rays traveling outwards from the region of the display on the concave side of the concave mirror array. The apex of each concave mirror may have either an opaque spot or line, or a transparent spot or line.

Technical Problem

A single device is needed to enable the capture of images that can be displayed on an auto-multiscopic 3D display in a system originally designed and configured for auto-multiscopic 3D image display.

Advantageous Effects of Invention

The improvements permit utilization of the auto-multiscopic 3D display system as a camera. When configured as a camera, ambient light enters a parallax barrier that forms the front wall of the camera box through pinholes or transparent spots in the parallax barrier (herein use of the term "pinhole" is intended to cover both a physical hole and a transparent spot). This describes, in a sense, a pinhole array camera in which each individual pinhole camera has a non-standard operating structure. Ambient light entering the camera box through the pinholes is reflected off the concave mirror array, which directs it towards a membrane used in some embodiments for image sensing that is located on the inner wall of the parallax barrier.

The concave mirror array may be set up to intercept and reflect the ambient light well before it reaches the focal plane of the pinholes, thus producing a substantially different distribution of image data in the resulting elemental images than a standard pinhole array camera would. For purposes of clarity, the term "elemental images" herein is used to refer to the individual images that, when combined in an array and displayed on an appropriate device, generate an auto-multiscopic 3D (or 2D) image.

Using a membrane in an auto-multiscopic 3D display system to sense rather than display images enables 3D image information to be captured on a 2D image surface.

Image sensing and display regions may also be placed adjacent to each other on the same device, provided that the membrane is used to capture and display images respectively in the relevant regions.

BRIEF DESCRIPTION OF DRAWINGS

The drawings illustrate preferred embodiments of the improvements to the auto-multiscopic 3D display system according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 13 illustrates an example of a concave mirror array camera.

FIG. 14 illustrates two examples: a first of a display with a colored image sheet that does not emit light on its own; and a second of a display used as a multi-directional white backlight for a colored image sheet.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
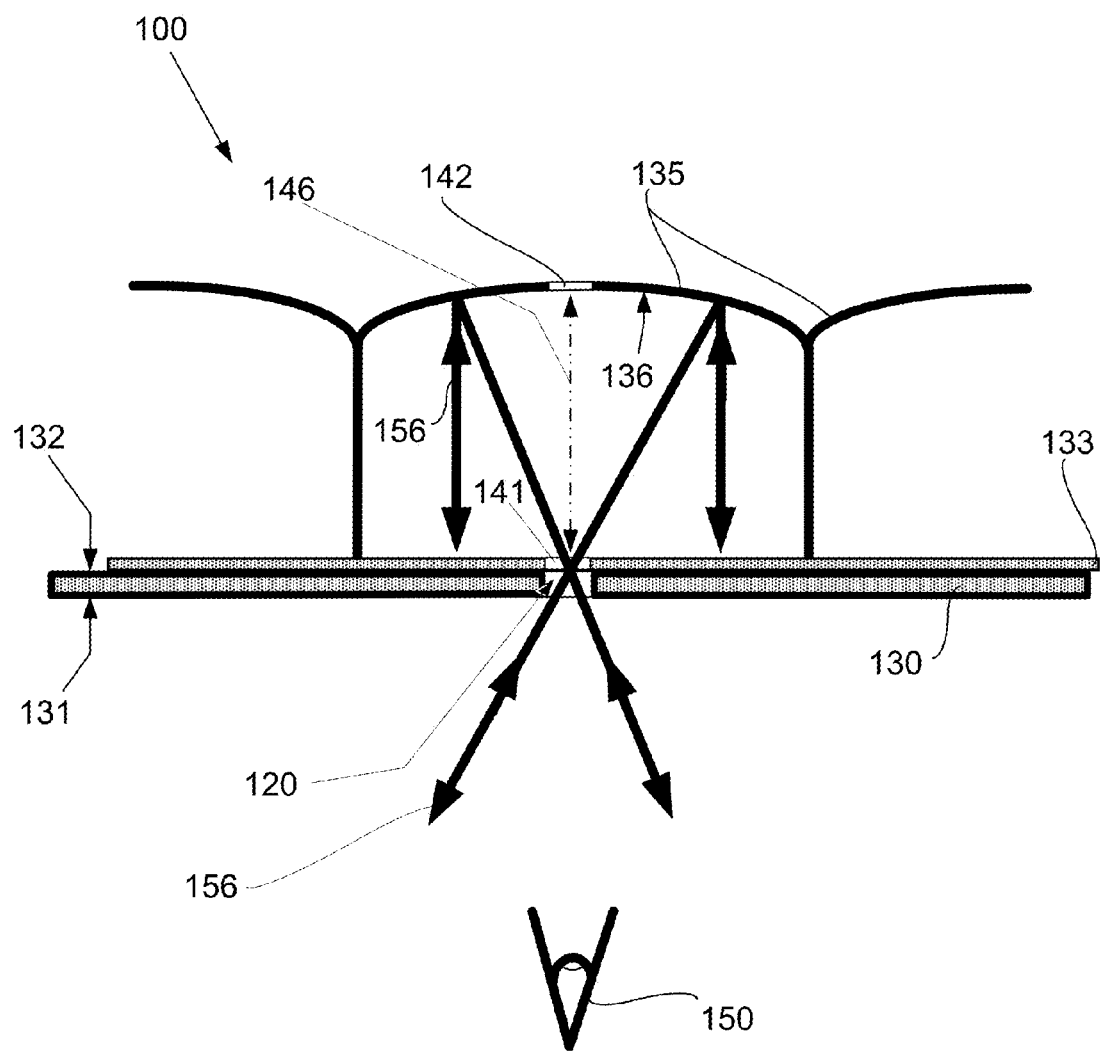
FIG. 1 is a top view of a preferred embodiment of an auto-multiscopic 3D display and/or camera system showing a membrane that can be used to sense or display images.

An apparatus (100), shown in FIG. 1, can be used to display auto-multiscopic 3D images and/or capture images that can be displayed on an auto-multiscopic 3D display. The apparatus (100) (also referred to as a display) includes a concave mirror array (800), a parallax barrier (130), and a membrane (133).

The concave mirror array (800) includes a plurality of concave mirrors (135) that form the array. The concave mirrors (135) in the concave mirror array (800) are ideally parabolic mirrors because light that approaches the reflective concave surface (136) of a bowl-shaped parabolic mirror, for example, along trajectories parallel to the axis of the bowl-shaped parabolic mirror, should ideally be reflected towards the bowl-shaped parabolic mirror's focal point. This is a known property of parabolic mirrors, whereas other types of concave mirrors like concave spherical mirrors may exhibit some amount of spherical aberration.

Each concave mirror in the concave mirror array (800) may be optically isolated from other concave mirrors with the use of opaque walls that extend from the edges of respective concave mirror sections to the surface of the membrane (133). The set of opaque walls that optically isolate an individual concave mirror section from other concave mirror sections may have cross-sections of various shapes, including but not limited to square, rectangular, hexagonal, circular and oval.

The concave mirror array (800) may be comprised of concave mirror sections that are also referred to as concave mirrors. Concave mirrors in the array may be optically isolated from each other with the use of opaque walls, as shown in FIG. 1. These opaque walls extend from the edges of respective concave mirror sections to the surface of the membrane (133).

Figure 2:
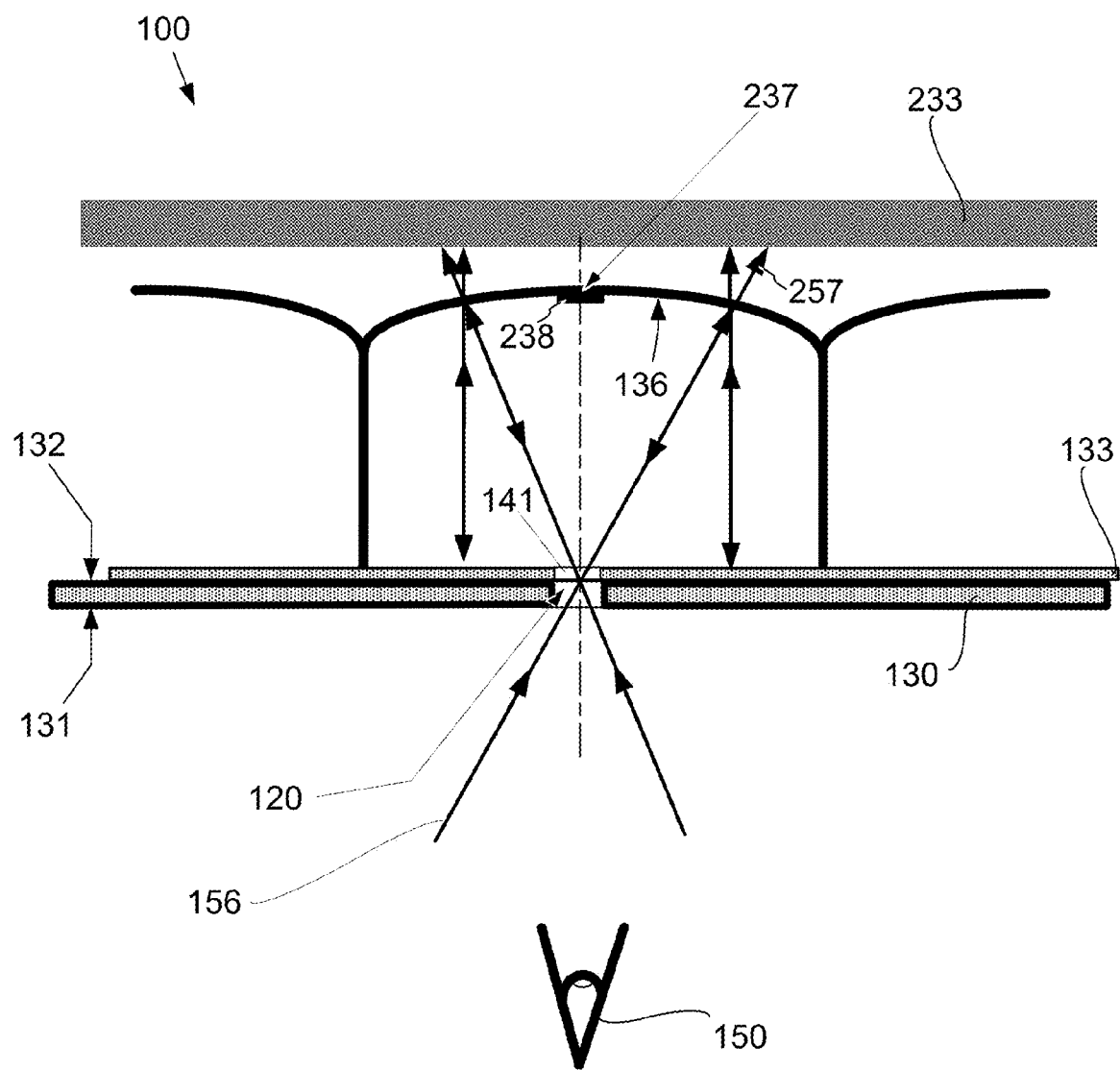
FIG. 2 is a top view of another preferred embodiment of an auto-multiscopic 3D display and camera system with concave reflective surfaces, a membrane that can be used to sense and/or display images and a second image sensor beyond the concave mirror array.
Figure 8:
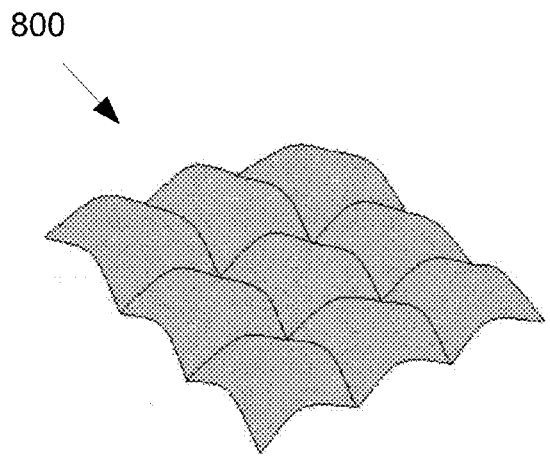
FIG. 8 illustrates an array of concave mirrors where each concave mirror has a bowl-like shape.
Figure 9:
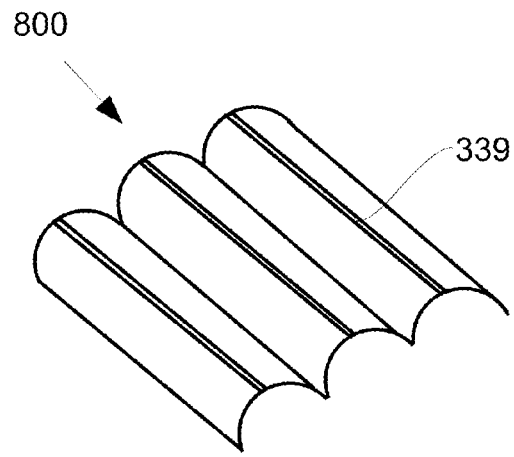
FIG. 9 illustrates an array of concave mirrors where each concave mirror has an elongated half-pipe shape.
Figure 10:
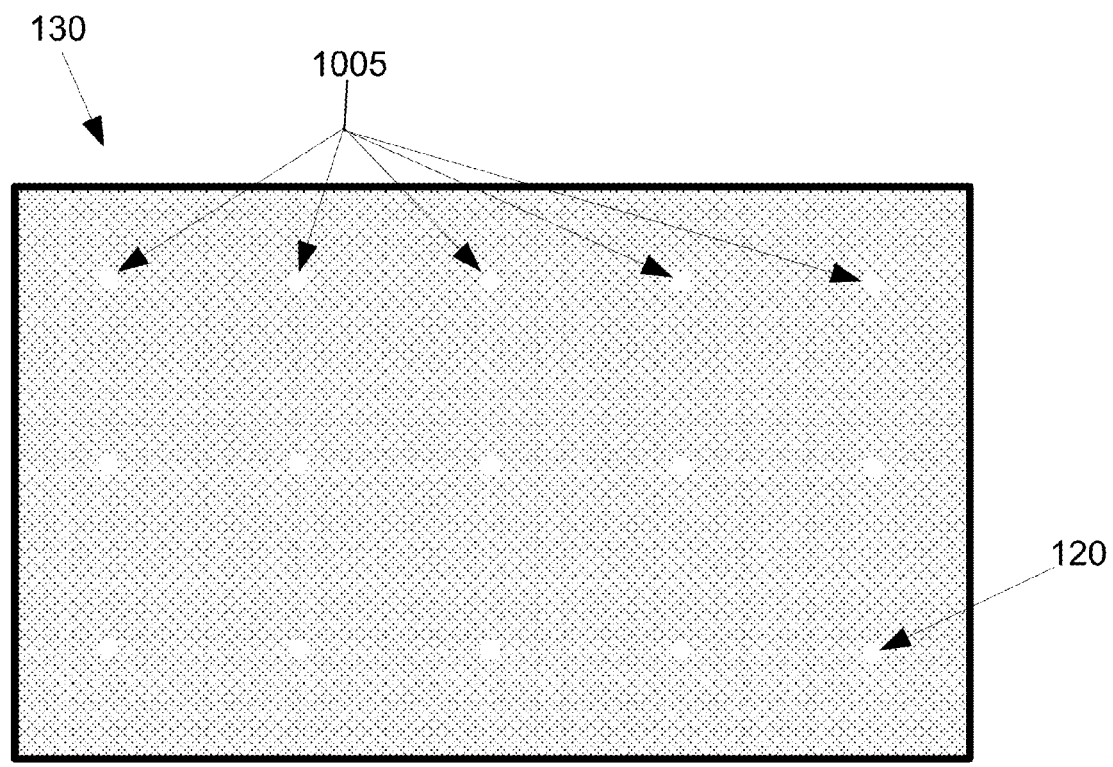
FIG. 10 illustrates an array of first transparent spots on the parallax barrier.
Figure 11:
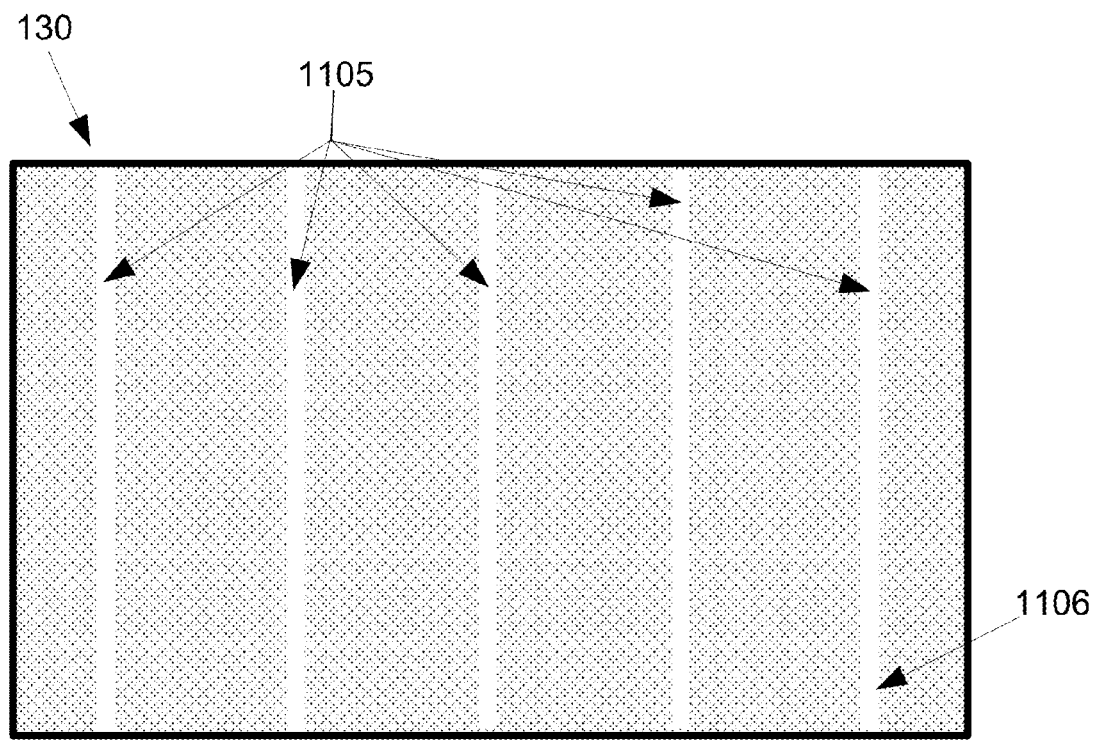
FIG. 11 illustrates an array of first transparent lines on the parallax barrier.

Two concave mirror arrays are illustrated in FIG. 8 and FIG. 9. As shown in FIG. 8, each concave mirror can have a bowl-like shape so that light rays reflected off its concave surface travel to a focal point (405). As shown in FIG. 9, each concave mirror can be elongated in a shape like a half-pipe so that it has a focal line (305). Thus, each concave mirror in a plurality of concave mirrors (135) has a reflective concave surface (136) and has a focal point (405) or a focal line (305). The reflective concave surface (136) also may be partially reflective so as to allow light to pass through the reflective concave surface (136) and to be reflected back off the reflective concave surface (136), as shown in FIG. 2.

The parallax barrier (130) is preferably rectangular with oppositely facing planar-like surfaces (somewhat like the LCD screen in a modern backlit LCD TV, for example), except that the side facing the viewer is opaque. Thus, the parallax barrier (130) includes a first-side (131) facing a viewer (150), wherein the first-side (131) of the parallax barrier (130) is opaque; except for an array of first transparent spots (1005) or an array of first transparent lines (1105), discussed below. In other embodiments, the first-side (131) (which is also referred to as the front of the display) and the second-side (132) of the parallax barrier (130) may have non-rectangular borders, as well as surfaces that may be curved or contoured. For example, the first-side of the parallax barrier may contain an array of indentations.

Figure 15:
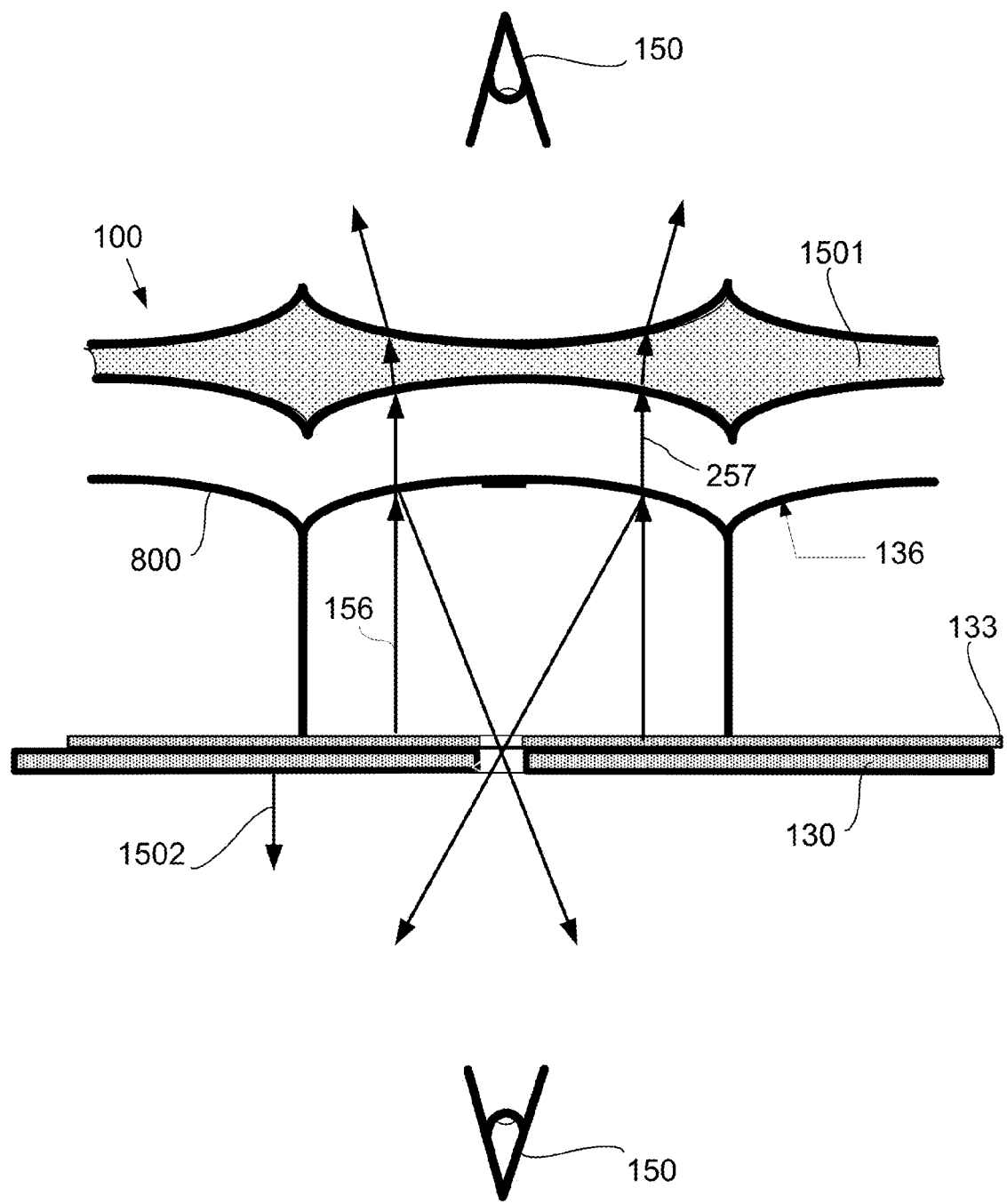
FIG. 15 is a top view of an embodiment of an auto-multiscopic 3D display system with a semi-transparent concave mirror array paired with a concave lens array.

The parallax barrier (130) includes a second-side (132), oriented opposite the first-side so that it faces away from a viewer (150) looking at the first-side (131). Since the first-side (131) is opaque, the second-side (132) would not be visible to the viewer (150) facing the first-side (131). The second-side (132) faces the reflective concave surface (136) of each concave mirror in the plurality of concave mirrors (135) in the concave mirror array (800). So, if the concave mirror array (800) is only partially reflective (semi-transparent), then, as shown in FIG. 15, the second-side (132) of the parallax barrier (130) and/or the membrane (133) may be visible to the viewer (150) facing the second-side (132), as is discussed later regarding FIG. 15.

When the concave mirror array (800) comprises the plurality of concave mirrors (135) with a focal point (405), that is, each of the concave mirrors has a bowl-like shape, then, the parallax barrier (130) further includes the array of first transparent spots (1005) extending through the parallax barrier (130). Each such transparent spot is located at the focal point (405) of each corresponding concave mirror section. The phrase "at the focal point" is intended to include minor variations that permit light coming from within the apparatus (100), that is intended to reach the region of space in front of the display, to exit the array of first transparent spots (1005). The term "transparent spot" is defined broadly to include a pinhole, which is necessarily transparent because it is a hole, or, for example, a glass or plastic spot that is transparent. The array of first transparent spots (1005) includes a first transparent spot (120) for each concave mirror in the plurality of concave mirrors (135) having the reflective concave surface (136). This is so that light that is focused by the respective concave mirror can pass through its own respective transparent spot and out of the parallax barrier (130), or alternately so that at least some of the ambient light entering a transparent spot may be collimated by its respective concave mirror. The phrase "at least some" is used to note the possibility of a partially reflecting concave mirror, as well as the possibility of light entering a transparent spot along non-optimal trajectories for collimation by its respective concave mirror. It also should be recognized that light exiting the parallax barrier would not necessarily travel towards a viewer of the display, since that light may travel in many different directions.

Similarly, when the concave mirror array (800) comprises the plurality of concave mirrors (135) with a focal line (305), that is, each of the concave mirrors has a half-pipe shape, then the parallax barrier (130) includes an array of first transparent lines (1105) where the transparency extends through the parallax barrier (130) at the focal line (305). Here again, the term "transparent line" is defined broadly to include a physical slit. Furthermore, the phrase "at the focal line" is intended to include minor variations that permit light coming from within the apparatus (100), that is intended to reach the region of space in front of the display, to exit the array of first transparent lines (1105). Thus, each first transparent line (1106) in the array of first transparent lines (1105) is defined to include a physical slit through the parallax barrier from the first-side (131) through to the second-side (132), and/or a transparent medium, like glass or plastic, that allows light to pass through the parallax barrier (130). Therefore, the array of first transparent lines (1105) preferably includes a first transparent line (1106) for each concave mirror in the plurality of concave mirrors (135).

The membrane (133) is located between the first-side (131) of the parallax barrier (130) and the concave mirror array (800). Preferably the membrane (133) is adjacent to the second-side (132) of the parallax barrier (130). In other embodiments, the membrane (133) may be mated to the second-side (132), thus effectively becoming an inside layer of the parallax barrier (130). In yet other embodiments, the membrane (133) can be offset from the second-side (132), at a distance from the second-side (132) but still between the parallax barrier (130) and the concave mirror array (800). The phrase "mated to the second-side (132)" includes a membrane that is defined by images etched, painted or printed on the second-side (132) of the parallax barrier (130).

Preferably, the membrane (133) is situated at a fixed distance (146) from the concave mirror array (800). Optionally, and in contradistinction to the membrane (133) being a layer of the parallax barrier (130), the membrane (133) may be situated at a second fixed distance from the parallax barrier (130). It is also noted that FIG. 1 shows that there may be a third fixed distance between the parallax barrier (130) and the concave mirror array (800).

Figure 16:
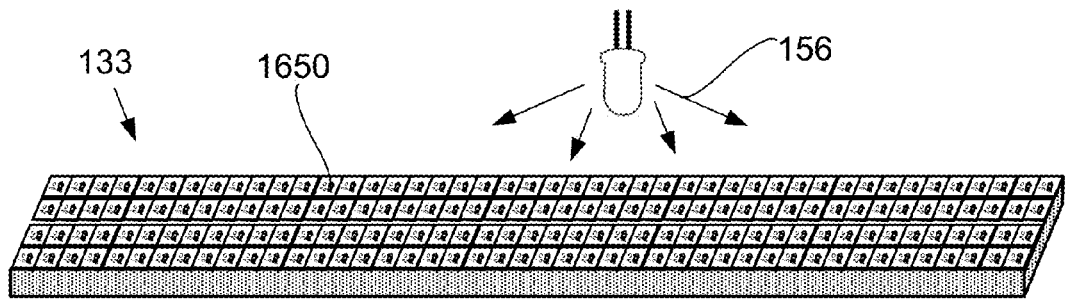
FIG. 16 is a perspective of a membrane capable of displaying an intrinsic image when illuminated.
Figure 17:
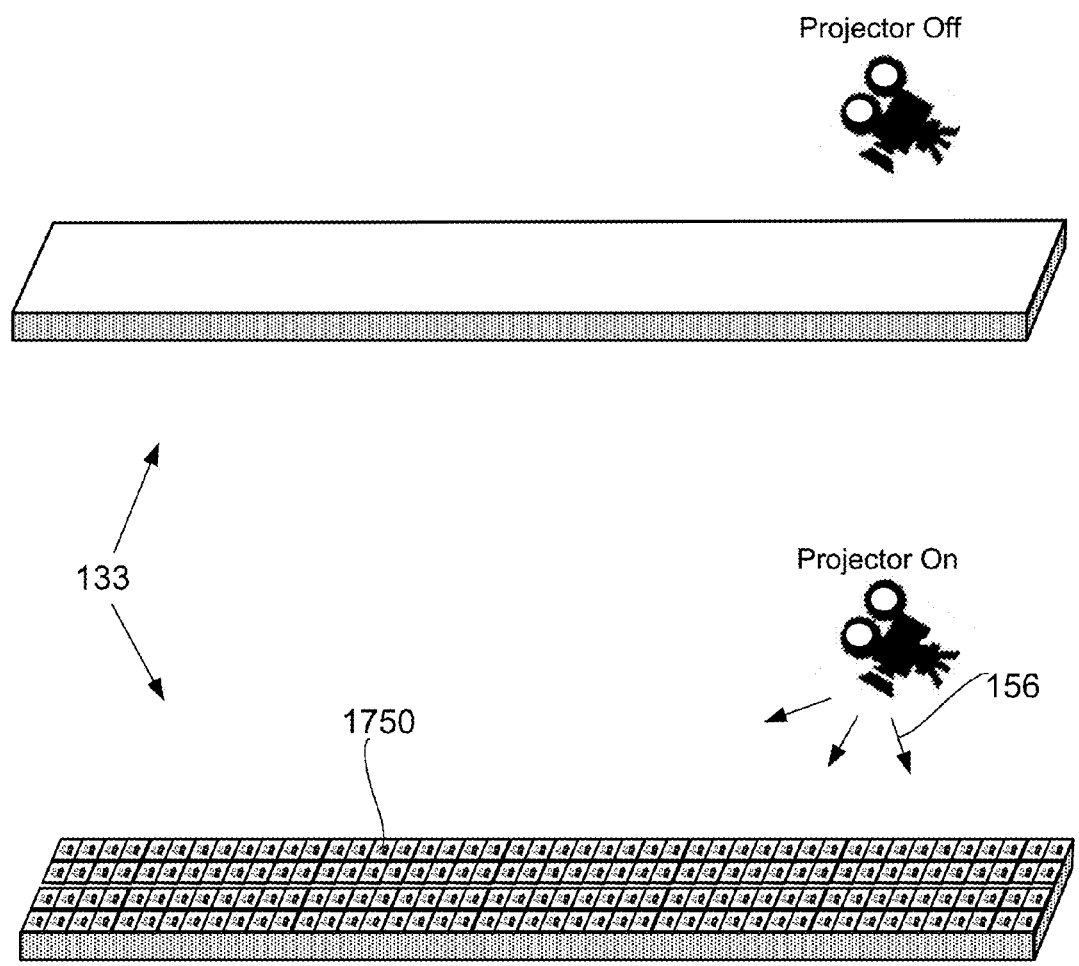
FIG. 17 is a perspective of a membrane capable of sensing a projected image or displaying an image that is projected onto it.

The membrane (133) is preferably configured with one or more of the following capabilities: First: with a capability, which is illustrated in FIG. 16, of a membrane (133) displaying an intrinsic image (1650) when illuminated; Second: with a capability of a membrane (133) sensing a projected image (1750) on the membrane (133), which is illustrated in FIG. 17. Third: with a capability, which is also illustrated in FIG. 17, of a membrane (133) displaying a projected image (1750) on the membrane (133); Fourth: with a capability, which is illustrated in FIG. 1 by the arrows pointing upward from the membrane (133), of a membrane (133) emitting light; and Fifth: with a capability of a combination of any of the first through the fourth capabilities. In FIG. 17, the membrane (133) in the upper position that is blank represents a region that will sense or display the projected image (1750), and the membrane (133) in the lower position illustrates the same region either sensing or displaying the projected image (1750). More specifically, the lower position shows an array of projected images on the membrane (133).

In the first capability, the membrane (133) is configured with a capability of displaying the intrinsic image (1650) when illuminated, that is, displaying an image that is contained in the membrane (133) itself, or that is physically intrinsic to the membrane (133), at the moment of its illumination by a light source (156). After being illuminated, light from the intrinsic image (1650) displayed on the membrane (133) travels up to the concave mirror array (800), from where it is reflected to each focal point (405) or focal line (305) and then exits out of the parallax barrier (130) through each, respective, first transparent spot (120) in the array of first transparent spots (1005), or each, respective, first transparent line (1106) in the array of first transparent lines (1105).

Figure 18:
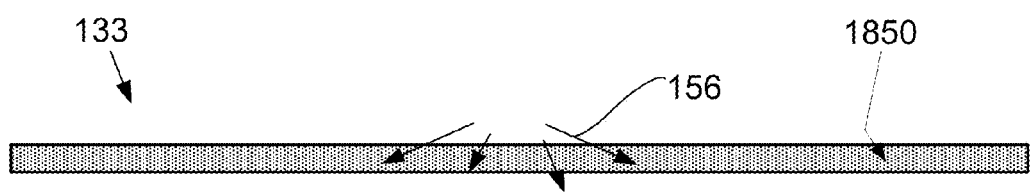
FIG. 18 is a side elevation view of a membrane passing some light through a translucent membrane body.

The first capability is also illustrated in FIG. 18, in which the membrane (133) is shown passing some light through a translucent membrane body (1850), such as a sheet of transparency film or an LCD screen. The light in this case illuminates the intrinsic image (1650) in the membrane (133), which may range from a very simple image (e.g. a transparent image with a homogenous color or no color at all) to a very complex image (e.g. a complex colored pattern with varying degrees of opacity). In FIG. 18, the membrane (133) is translucent so as to color light that passes through it, or so as to tint or otherwise augment the intrinsic image (1650) on the second-side (132) of the parallax barrier (130), which is located below the membrane (133). The membrane (133) may also be completely transparent (or nearly so), with little or no ability to color or block light that passes through it.

It is noted for clarity that discussion in the foregoing paragraph about the membrane (133) being able to tint or augment "the intrinsic image (1650)" on the second-side (132) of the parallax barrier (130) may be interpreted as, effectively meaning in some embodiments, that the second-side (132) of the parallax barrier is the membrane (133). Because the parallax barrier (130) is opaque in preferred embodiments, the second-side (132) of the parallax barrier (130) may effectively have an intrinsic image on it, even if it is a very simple intrinsic image like a white surface, or it may have a transparent surface. Also, a membrane (133) that is an independent component may be deemed to be a first transparent solid (406) if the intrinsic image (1650) is defined as being on the second-side (132) of the parallax barrier (130) and as being the membrane (133). It is furthermore noted that the parallax barrier (130) may also have internal structural features that are visible through the second-side (132), which may contribute to an image that is visible when looking at the second-side (132). Thus in some embodiments the membrane (133) may also be considered to comprise part of the internal volume of the parallax barrier (130). In some embodiments (such as, for example, having an opaque white colored second-side of the parallax barrier (130) adjacent to a translucent membrane), the second-side (132) of the parallax barrier (130) may serve to assist in obtaining optimal illumination of a translucent membrane by a light source, so in operation the two components may often be related.

In the second capability, the membrane (133) is configured with a capability of sensing (i.e. capturing) an image projected onto the membrane (133). In this configuration, light from the light source (156) (for example, ambient light that enters the camera apparatus) is either reflected from the concave mirror array (800) onto the membrane (133) or passes through the concave mirror array (800) to reach the membrane (133). Light can pass through the concave mirror array (800) if the reflective concave surface (136) also allows some light to pass through the reflective concave surface (136). In such a case, the reflective concave surface (136) is partially reflective, as illustrated in FIG. 2. The membrane (133) shown in FIG. 17 is intended to illustrate the second capability by showing a captured image as a representation of the image sensing process. For example, it roughly illustrates a latent image on a recently exposed film surface, exaggerating the visibility of the latent image for emphasis.

In the third capability, which is also illustrated in FIG. 17, the membrane (133) is configured with a capability of displaying a projected image (1750) on the membrane, that is, displaying an image on the membrane (133) that is not contained in the membrane (133) itself, or that is not physically intrinsic to the membrane (133) directly prior to its illumination by projected light. The timing "directly prior to" is important to encompass an embodiment wherein the projector, as a light source (156), can physically alter the membrane, analogous to for example, a laser printer physically altering the appearance of a sheet of paper.

Figure 19:
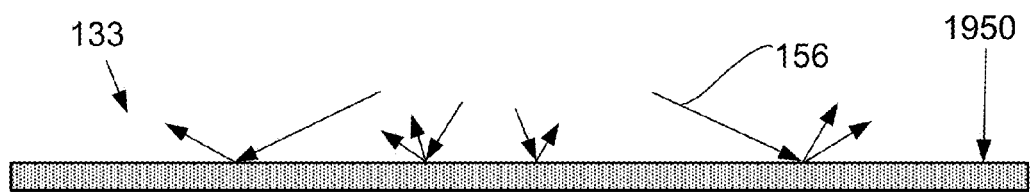
FIG. 19 is a side elevation view of a membrane reflecting incident light from a light source in a variety of ways.

In FIG. 19, which also illustrates this third capability, the membrane (133) is shown functioning as a projection screen (1950), which reflects incident light from a light source (156) in a variety of ways, thereby displaying a projected image (1750) on its surface. A projection screen (1950) may also transmit incident light through its volume (which is not shown in FIG. 19) in a variety of ways, as part of the process of displaying a projected image (1750), for example if it is a rear projection screen.

The third capability thus allows for the membrane (133) to reflect incident light from a light source (156) in a variety of ways, including diffuse reflection of light (as might occur, for example, with a white movie screen that displays a projected image (1750) that is projected onto it by a movie projector), and specular reflection of light (as might occur, for example, with a standard plane mirror that displays a projected image (1750) of a scene in front of it, that is, an auto-multiscopic 3D mirror image of that scene). The third capability thus also allows for the membrane (133) to transmit light through its volume as part of the process of displaying a projected image (1750), as occurs with a rear projection screen. In the third capability, the membrane (133) may also have a retroreflective surface.

In one example of an apparatus (100) with the membrane (133) that has this third capability combined with the concave mirror array (800) that is also partially silvered, an image formed by ambient light that has entered the apparatus (100) and has subsequently been reflected off the concave mirror array (800) onto the membrane (133), when the membrane (133) has a reflective, mirror-like surface, will be reflected back by the membrane (133) towards the reflective concave surface (136) to then pass through the concave mirror array (800) and be captured by an image sensor (233) located behind the concave mirror array (800).

In another example of an apparatus (100) with a membrane (133) that has this third capability, the membrane (133) may be used as a projection screen (1950) that displays a projected image (1750) that is projected onto it. For example, the membrane (133) may be opaque and white colored, and an image may be projected onto the membrane (133) by an electronic display located behind the reflective concave surface (136) that is partially silvered. The reflective concave surface (136) that is partially silvered would then focus light that bounces off the membrane (133) on transparent spots or transparent lines in the parallax barrier (130), enabling the light to exit the display, to wit, the apparatus (100). When the membrane (133) functions as a projection screen (1950), the membrane (133) may be translucent, as would be the case with a rear projection screen, which allows light to pass through it (which is not shown in FIG. 19).

FIG. 18 may also be interpreted to illustrate a membrane (133) serving as a rear projection screen. In this case, the membrane (133), which has a translucent membrane body (1850), is configured to display an image that is projected onto it, in such a way that the projected image (1750) is visible on the opposite side of the membrane (133) from the light source (156) that projects it onto the membrane (133).

In the fourth capability, the membrane (133) is configured with a capability of emitting light, which is illustrated in FIG. 1 by the arrows pointing upward from the membrane (133). The membrane in this case may be a transparent OLED display.

Other light-emitting displays may also function as a membrane (133) with the fourth capability, such as, for example, a light-emitting display consisting of an array of colored LED lamps that is capable of forming an image using similar principles to an LED billboard. It is noted that in this case, such a light emitting display, which would act as a membrane (133), would emit light away from a viewer facing the first-side (131) of the parallax barrier (130) in the auto-multiscopic 3D display (that is, the apparatus (100)), and would have to contain an array of transparent spots or lines that enable light to exit the auto-multiscopic 3D display after being reflected off the reflective surface of the corresponding concave mirror array in the apparatus (100).

In the fifth capability, the membrane (133) is configured for a combination of any two or more of the first through fourth capabilities noted above. For example, the membrane (133) may be configured for both displaying the intrinsic image (1650) when illuminated (in some areas) and sensing an image projected onto the membrane (133) (in other areas).

For embodiments wherein the concave mirror array (800) includes the plurality of concave mirrors (135) with a focal point (405), the membrane (133) includes a second transparent spot (141) for each focal point (405) in at least a plurality of focal points from the concave mirror array (800). Each second transparent spot (141) is located at one focal point (405) in the plurality of focal points.

For embodiments wherein the concave mirror array (800) includes the plurality of concave mirrors (135) with a focal line (305), the membrane (133) includes a second transparent line (309) for each focal line (305) in at least a plurality of focal lines from the concave mirror array (800). Each second transparent line (309) is located at one focal line (305) in the plurality of focal lines.

The apparatus (100) may further include a light source (156) that is either capable of illuminating the membrane (133), for example so that light from the intrinsic image (1650) on the membrane (133) travels towards the concave mirror array (800) and is then reflected out of the display through a focal point (405) or focal line (305) in the parallax barrier (130), or that is capable of projecting an image (i.e. a projected image (1750)) onto the membrane (133) that, for example, may be captured by the membrane when the membrane (133) is an image sensor (233), or, for example, may be displayed by the membrane when the membrane (133) functions as a projection screen (1950). It is also noted that the light source (156) that is capable of projecting an image onto the membrane (133) may also do so by indirectly projecting an image onto the membrane (133), or in other words, with the help of the concave mirror array (800).

A light source located behind the concave mirror array (800) may be used to illuminate the membrane (133) when the reflective concave surface (136) is partially silvered.

As an example, this light source may be a white-light-emitting display that is located close enough to the membrane (133) that the majority of the light emitted by the light source passes through the concave mirror array (800), which is partially silvered in this example, and reaches the membrane (133). This white-light-emitting display may have an array of spots or lines on its surface that are individually aligned with the second transparent spot (141) or second transparent line (309), respectively, in the membrane (133) and the first transparent spot (120) or first transparent line (1106), respectively, in the parallax barrier (130) and do not emit light.

Alternately if this white-light-emitting display emits white light across its entire surface, then opaque spots or lines in the apexes of the concave mirrors in the array, that are respectively aligned with the transparent spots or lines in the membrane (133) and respectively aligned with the transparent spots or lines in the parallax barrier (130), may be used to prevent white light from traveling directly from the white-light-emitting display, through the partially silvered concave mirror array, and out of the parallax barrier (130), along trajectories perpendicular to the membrane's surface.

In this example, the white-light-emitting display would send light through the convex side of the reflective concave surface (136) that is partially silvered, thus illuminating the membrane (133) with white light. For this example, the membrane (133) would ideally be a colored image sheet with an array of transparent spots or lines in it that are aligned with the array of transparent spots or lines in the parallax barrier (130). As examples, the membrane (133) might be a sheet of transparency film that has the intrinsic image (1650) on it, a liquid crystal display (LCD) panel that is capable of displaying the intrinsic image (1650) when illuminated by a light source (156), or a painted or printed image (i.e. the intrinsic image (1650)) on the second-side (132) (inner surface) of the parallax barrier (130). The second-side (132) of the parallax barrier (130) underlying the membrane (133) would ideally be white colored. White light emitted by the light-emitting display that passes through the reflective concave surface (136) that is partially silvered would illuminate the membrane (133), causing image related light to travel from the membrane (133) towards the reflective concave surface (136) that is partially silvered, which would then focus some of this light on the transparent spots or lines in the membrane (133) and parallax barrier (130), enabling the light to exit the display.

The light from the light-emitting display in this example may alternately be colored light, which would be achievable for example with a backlit LCD screen, a regular OLED display, or a transparent OLED display, and could be used to provide tinting effects to the intrinsic image (1650) on the membrane (133).

In another example, when the membrane (133) is configured with the capability of displaying the projected image (1750) on the membrane, as in the third capability, described above, a light-emitting display behind the concave mirror array that emits complex colored light images (such as an array of elemental images, for example) may still be used to illuminate it. However, this exemplary embodiment would generally be a non-optimal configuration unless light from the light-emitting display can be strictly collimated so that individual light rays from the light-emitting display reach the membrane along trajectories that are perpendicular to the membrane's surface. Without such strict collimation, stray colored light rays emitted by the light-emitting display along trajectories that are not perpendicular to the membrane's surface might be able to escape the parallax barrier (130) through transparent spots or lines in the parallax barrier (130), causing a jumbled image for a viewer (150) of the display.

In this example, the light-emitting display would send light through the convex side of the concave mirror array (800), which is partially silvered. This light would then be reflected off the membrane (133), which has a reflective, mirror-like surface, back towards the reflective concave surface (136) that is partially silvered. In turn, the reflective concave surface (136) that is partially silvered would then reflect some of this light out through the first transparent spot (120) or first transparent line (1106) in the parallax barrier (130) and the second transparent spot (141) or second transparent line (309) in the membrane (133).

In this example, there would be no need for the light emitting display to omit any portions of elemental images, as it would be able to project some image related light directly through the first transparent spot (120) or first transparent line (1106) in the parallax barrier (130). However, if means are not used to ensure that nearly all light emitted by the light emitting display approaches the membrane (133) at perpendicular angles to the membrane's surface, then some of the light emitted by the light emitting display may be able to approach the first transparent spot (120) or first transparent line (1106) in the parallax barrier (130) along trajectories that are not perpendicular to the membrane's surface, and subsequently exit the parallax barrier (130), leading to a jumbled image for a viewer (150) of the display.

The embodiment shown in FIG. 2 encompasses 2 styles of array camera in one, as the membrane (133) configured as an image sensor and the image sensor (233) above the concave mirror array (800) are located on opposite sides of the concave mirror array (800), in which each reflective concave surface (136) is partially silvered. That is, if the membrane (133) is configured for sensing an image projected onto the membrane (133) (i.e. the projected image (1750)), and the image sensor (233) also senses images, then the embodiment shown in FIG. 2 effectively combines an array of modified pinhole cameras (each similar to the camera in FIG. 12) with an array of more standard pinhole cameras in which the image sensor is located on a flat back wall facing the pinhole. A setup like this could be useful for certain types of image processing, i.e. because the elemental images captured by the different styles of pinhole cameras could be directly compared or contrasted. Alternately, a setup like this may be used to capture portions of elemental images that are missing due to the presence of transparent spots or lines in the membrane (133) that is configured for image capture.

Other arrangements are also possible in which the image sensor (233) is the only image sensor. For example, if ambient light enters the array of first transparent spots (1005) extending through the parallax barrier (130), and is then collimated by the concave mirror array (800) that is partially silvered and directed towards the membrane (133), which is not an image sensor but has a reflective surface (thus enabling it to display the projected image (1750) that is projected onto it), then the image sensor (233) would pick up some light from the image on the reflective membrane, as well as other light that enters the array of first transparent spots (1005) extending through the parallax barrier (130) and reaches the image sensor (233) directly after traveling through the reflective concave surface (136), which is partially silvered.

Each concave mirror in the concave mirror array (800) is defined by an apex (237). For embodiments wherein the concave mirror array (800) includes the plurality of concave mirrors (135) with a focal point (405), then either an opaque spot (238) or a third transparent spot (142) is located at the apex (237) of each concave mirror in the concave mirror array (800). The opaque spot (238) helps to prevent ambient light (or other stray light) that enters the display through the parallax barrier (130) from being reflected straight back from the reflective concave surface (136) and subsequently emitted out of the parallax barrier (130). This opaque spot (238) may also be used to help prevent light from a light-emitting display located behind the concave mirror array (800), when the reflective concave surface (136) of concave mirror array (800) is partially reflective, from traveling through the apex (237) in each concave mirror in the concave mirror array (800), then through the second transparent spot (141) in the membrane (133), and then out of the parallax barrier (130).

The third transparent spot (142) enables light to pass through the concave mirror array (800), which also helps to prevent ambient light (or other stray light) that enters the display through the parallax barrier (130) from being reflected straight back from the reflective concave surface (136) and subsequently emitted out of the parallax barrier (130).

Similarly, for embodiments wherein the concave mirror array (800) includes the plurality of concave mirrors (135) with a focal line (305), then either an opaque line (338) or a third transparent line (339) is located at the apex (237) of each concave mirror in the concave mirror array (800). The opaque line (338) helps to prevent ambient light (or other stray light) that enters the display through the parallax barrier (130) from being reflected straight back from the reflective concave surface (136) and then being emitted out of the parallax barrier (130). This opaque line (338) may also be used to prevent light from a light emitting display located behind the concave mirror array (800), when the reflective concave surface (136) of the concave mirror array (800) is partially reflective, from traveling through the apex (237) in each concave mirror in the concave mirror array, then through the second transparent line (309) in the membrane (133), and then out of the parallax barrier (130). The third transparent line (339) enables light to pass through the concave mirror array (800), and again helps to prevent ambient light (or other stray light) that enters the display through the parallax barrier (130) from being reflected straight back from the reflective concave surface (136) and subsequently being emitted out of the parallax barrier (130).

In display embodiments where each of the plurality of concave mirrors (135) has the third transparent spot (142) or the third transparent line (339), an additional display may be located behind the concave mirror array (800) (ideally when the concave mirror array (800) is fully reflective) to fill in any portions of elemental images that are missing due to the array of first transparent spots (1005) or the array of first transparent lines (1105) in the parallax barrier (130) and the membrane (133). In some embodiments, a convex lens may be placed between the membrane (133) and the concave mirror array (800), near the third transparent spot (142), to facilitate the focusing of light from this additional display, which passes through the apex (237), on the first transparent spot (120) in the parallax barrier (130). Similarly, a convex lens may be placed between the membrane (133) and the concave mirror array (800), near the third transparent line (339), to facilitate the focusing of light from an additional display that travels through the apex (237), on the first transparent line (309) in the parallax barrier (130). Although this additional display may be a light emitting display, it may also be a display that does not emit light on its own, such as a display that displays an intrinsic image (1650) when illuminated by a light source (156), or a display that displays a projected image (1750) that is projected onto it.

Example 1

Figure 12:
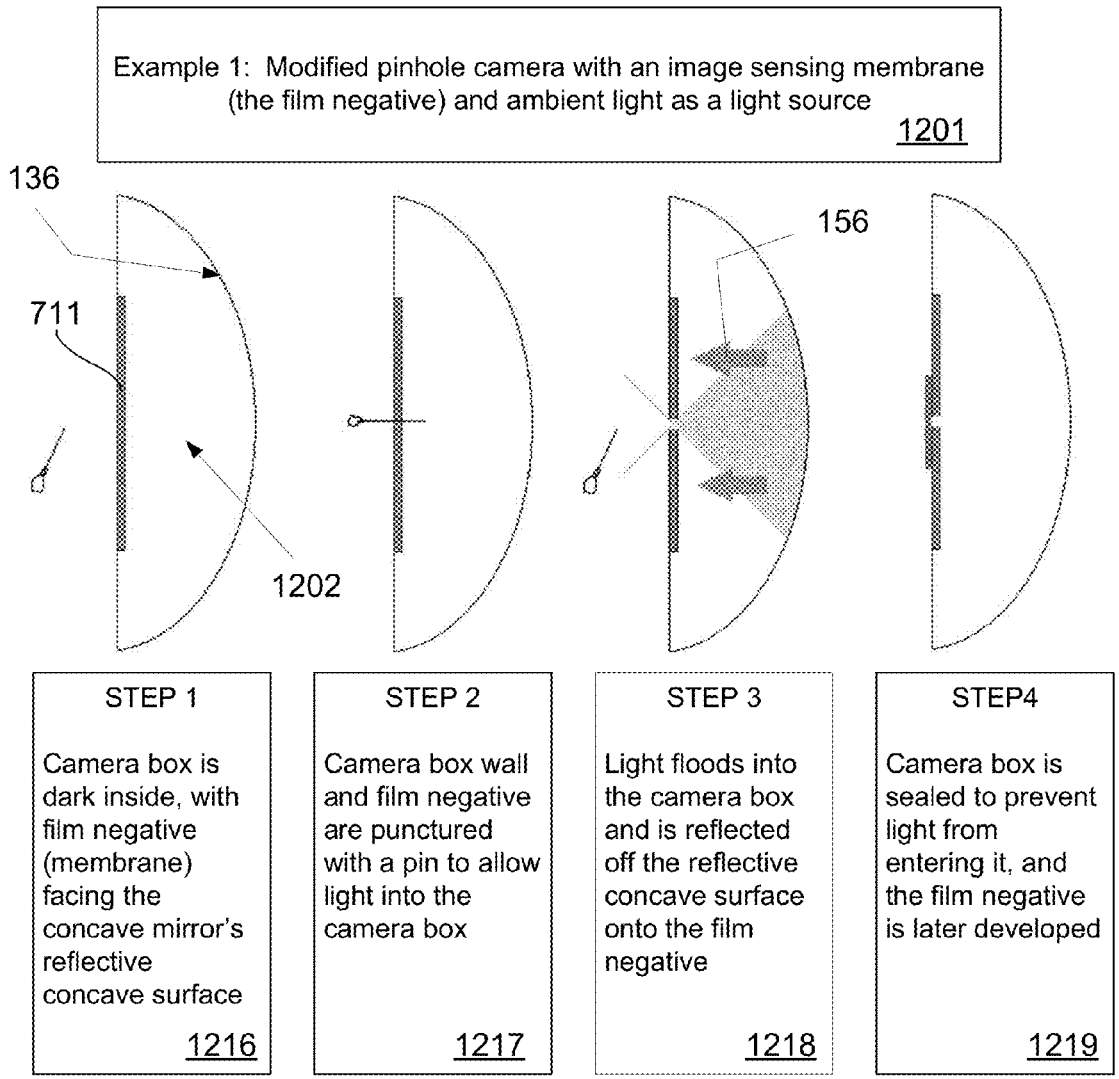
FIG. 12 illustrates an example of a modified pinhole camera.

FIG. 12 illustrates Example 1 (1201): Modified pinhole camera with an image sensing membrane (the film negative) and ambient light as a light source (156). In STEP 1 (1216), the camera box is dark inside, with a film negative (711) for each reflective concave surface (136). In STEP 2 (1217), the camera box wall and the film negative (711), which are ideally adjacent to each other, are punctured with a pin to allow light into the camera box (1202), thus creating adjacent pinholes in both surfaces. In STEP 3 (1218), light floods into the camera box and is reflected by the reflective concave surface (136) onto the film negative (711). In STEP 4 (1219), the camera box (1202) is sealed to prevent light from entering it, and the film negative (711) is later developed. An array of modified pinhole cameras of this type would together form an array camera, that could be described by the apparatus (100) in its camera form.

The apparatus (100) may include a transparent gas (306) occupying a volume between the concave mirror array (800) and the parallax barrier (130). Air, nitrogen, argon or another transparent gas may be used.

The apparatus (100) may include the first transparent solid (406) occupying a volume between the concave mirror array (800) and the parallax barrier (130). Glass or plastic are examples of the first transparent solid (406). The first transparent solid (406) may be only semitransparent. For example, it may be translucent, such as a film transparency sheet, which may also have opaque (or nearly opaque) regions. Alternately, for example, it may contain opaque specks embedded within an otherwise transparent or translucent solid.

The apparatus (100) may include a transparent liquid (307) occupying a volume between the concave mirror array (800) and the parallax barrier (130). Water or alcohol are examples of the transparent liquid (307). The transparent liquid (307) may also be semitransparent or translucent.

Figure 3A:
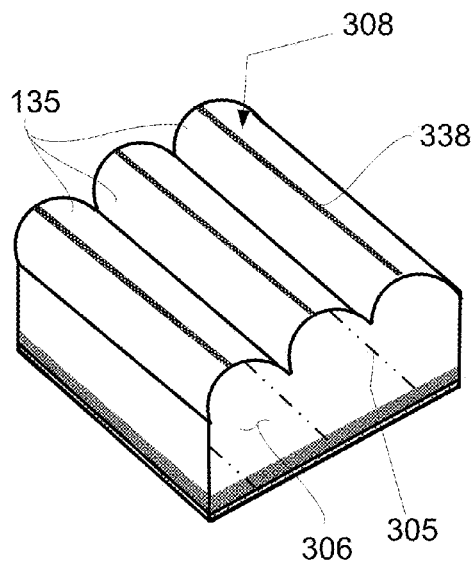
FIG. 3A is a perspective of a display having a concave mirror array in which each concave mirror has the shape of a sectioned pipe having an opaque line at the apex and with a transparent liquid filling the volume between the concave reflective surface and the membrane.
Figure 3B:
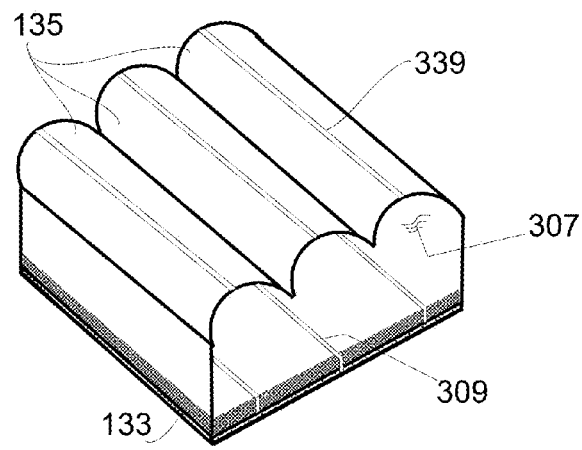
FIG. 3B is a perspective of a display having a concave mirror array in which each concave mirror has the shape of a sectioned pipe having a transparent line at the apex and with a transparent gas filling the volume between the concave reflective surface and the membrane.
Figure 4:
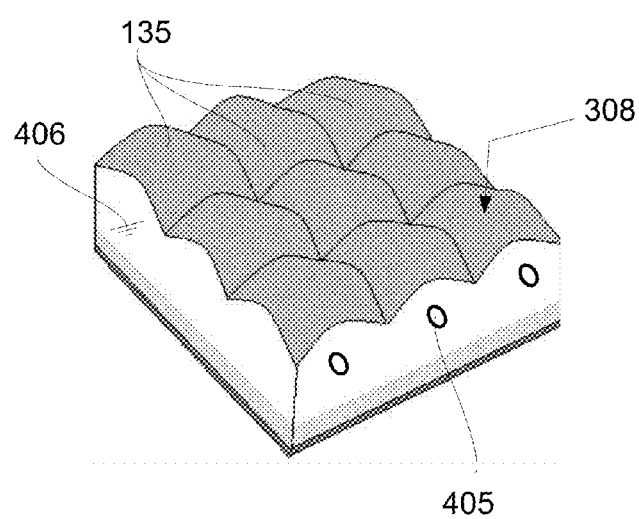
FIG. 4 is a perspective of a display having a concave mirror array where each concave mirror has a bowl-like shape.

For embodiments of the apparatus (100) wherein the concave mirror array (800) has the reflective concave surface (136) that permits some light to pass through it, as shown in FIG. 2, there may be a second transparent solid (506) or the image sensor (233) located adjacent to the convex surface (308) of the concave mirror array (800). The image sensor (233) may also be located at a fixed distance from the convex surface (308) of the concave mirror array (800), for example to facilitate better focusing of an image on the image sensor (233). As shown in FIG. 3A and FIG. 4, the convex surface (308) is located on the side of the concave mirror array (800) opposite to the reflective concave surface (136).

For such embodiments, each concave mirror in the plurality of concave mirrors (135) in the concave mirror array (800) is configured with a convex surface (308), the convex surface (308) being on a side of the concave mirror array (800) opposite to the reflective concave surface (136). Each concave mirror in the plurality of concave mirrors (135) in the concave mirror array (800) is also configured to permit a portion of light (257) to pass through the reflective concave surface (136).

Figure 5A:
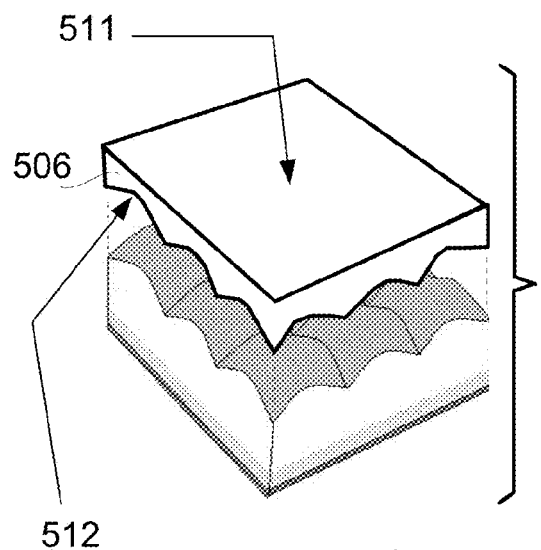
FIG. 5A is an exploded view of a display showing a second transparent solid conforming to the convex side of the concave mirror array where each concave mirror has a bowl-like shape.
Figure 5B:
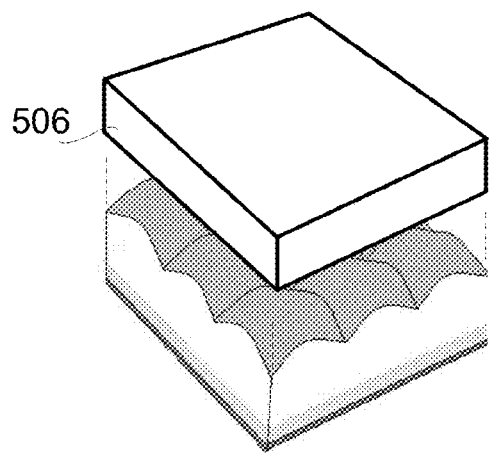
FIG. 5B is an exploded view of a display showing a second transparent solid as a flat rectangular block adjacent to the convex side of the concave mirror array where each concave mirror has a bowl-like shape.
Figure 6:
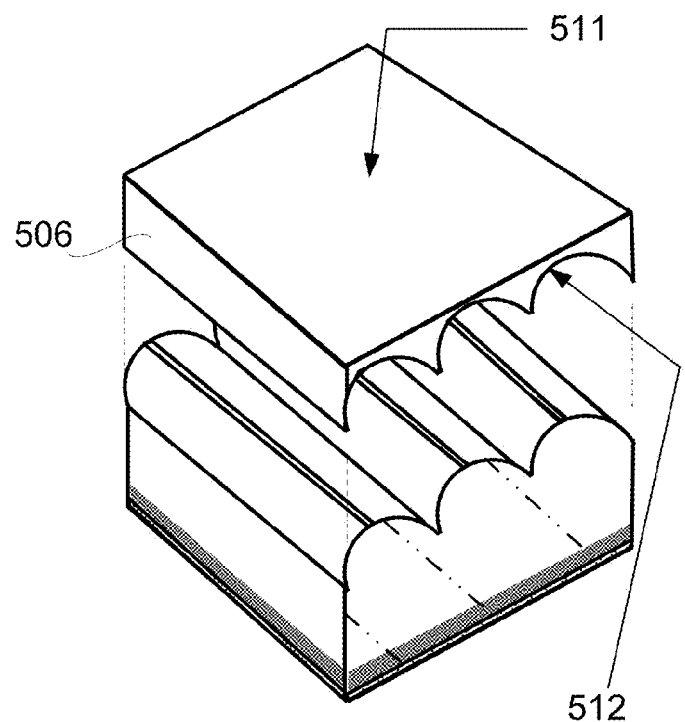
FIG. 6 is an exploded view of a display showing a second transparent solid conforming to the convex side of the concave mirror array where each concave mirror has an elongated half-pipe shape.
Figure 7:
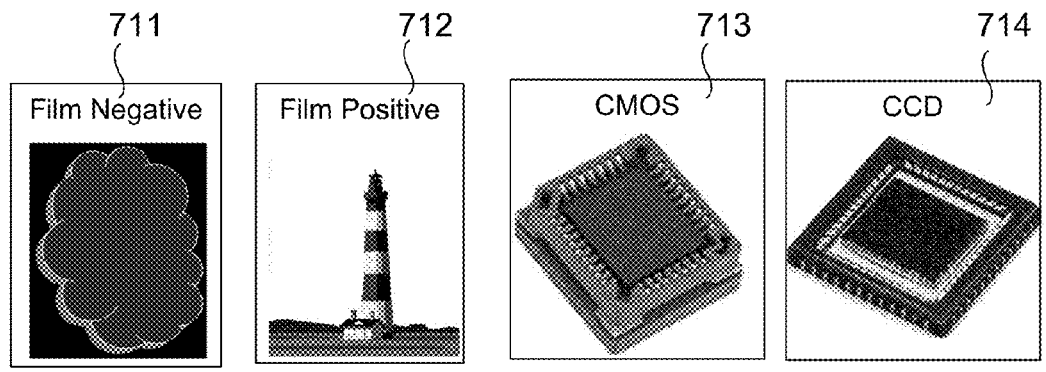
FIG. 7 illustrates a variety of image sensors.

For embodiments with the second transparent solid (506), as shown in FIG. 5A and FIG. 5B, the apparatus (100) then includes the second transparent solid (506) located adjacent to the convex surface (308). The second transparent solid (506) may be configured as the concave lens array (1501). The second transparent solid (506) is situated on (or very near) the convex surface (308) of the concave mirror array (800) (at a fixed orientation relative to the concave mirror array (800)). The second transparent solid (506) is ideally situated on or very near the convex surface (308) of the concave mirror array (800) to either help maximize the amount of light from the light source (156) that passes through it, help limit the thickness of the display apparatus, or both.

When configured as a concave lens array (1501), the second transparent solid (506) alters the trajectories of light rays traveling outwards from the region of the display between the parallax barrier (130) and the concave mirror array (800).

In an alternative arrangement, the second transparent solid (506) is defined by a flat surface (511) opposite to a conforming surface (512), where said conforming surface (512) is defined by a shape mating with the convex surface (308) of the concave mirror array (800). This enables the second transparent solid (506) to be used as a spacer. The addition of this second transparent solid (506) to the apparatus (100), particularly when used in conjunction with the first transparent solid (406) on the opposite side of the concave mirror array (800), enables the concave mirror array (800) to be sandwiched between the first transparent solid (406) and the second transparent solid (506), thus helping to protect the concave mirror array (800) from damage.

For embodiments with the image sensor (233) located on the same side of the concave mirror array as the convex surface (308), the image sensor is configured to capture images transmitted through the concave mirror array (800), when the concave mirror array is partially silvered. The image sensor (233) may have a fixed orientation relative to the partially silvered concave mirror array. Preferably, the surface of the image sensor (233) is parallel (or substantially so, e.g. plus or minus 5 degrees) to the membrane's surface, and at a fixed orientation relative to the membrane (133).

Any image sensor used in the apparatus (100) is preferably comprised of a known image sensor, such as for example, a complementary metal-oxide semiconductor (CMOS) chip (713), a charge-coupled device (CCD) chip (714), a film positive (712), and a film negative (711).

It is furthermore noted for the sake of completeness that display arrangements are possible in which the concave mirror array has reflecting concave surfaces, but does not have directly accessible reflecting convex surfaces on the opposite side from the reflecting concave surfaces. For example, a concave mirror array formed from an opaque rectangular cuboid block of metal that is flat on one face and has reflecting concave surfaces etched into the opposite face, in such a way that light cannot reach them through the flat face of the rectangular cuboid block of metal, would not have directly accessible reflecting convex surfaces.

Example 2

FIG. 13 illustrates Example 2 (1301): A concave mirror array camera. The panels on the right illustrate surfaces in the device. Surface 1: (1302) is a concave mirror array (with reflecting concave surfaces, which are shown with opaque dots on their apexes). Surface 2: (1303) is an image sensing membrane facing the reflective surface of the concave mirror array. Surface 3: (1304) is a parallax barrier with a pinhole array facing a scene in front of the camera. The bottom figure simply represents ambient light (1305), which enters surface 3 through pinholes and is reflected off surface 1 onto surface 2. An optional camera shutter is not shown. This example illustrates that use of an image sensing membrane as a layer of the parallax barrier enables image capture for auto-multiscopic 3D display devices with a very thin form factor camera. Image sensing and display regions can also be mixed on the same device.

In an alternative embodiment, the image sensor (233) is located behind the concave mirror array (800), provided that the respective apexes of the concave mirrors in the array each contains the third transparent spot (142) or the third transparent line (339). For this embodiment, the concave mirror array may or may not be partially silvered. The image sensor (233) in this embodiment is preferably used to capture portions of elemental images that are missing due to the presence of the second transparent spots or second transparent lines in the membrane (133), which is also an image sensor. Each second transparent spot (141) or second transparent line (309) in the membrane (133) helps to enable ambient light to enter the apparatus (100) operating as a camera.

Example 3

FIG. 14 illustrates two exemplary display embodiments with different light sources: LS1 (1401) is a display with a colored image sheet that does not emit light on its own (i.e. that contains the intrinsic image (1650)); and LS2 (1404) is a display that is used as a multi-directional white backlight for a colored image sheet. In each display embodiment, the concave mirror array is shown with opaque dots on the apexes of the concave mirrors in that array.

The left column in FIG. 14 describes multiple ways in which a light source may illuminate the membrane (133) with white light, including edge lighting of the region between the parallax barrier (130) and the concave mirror array (800) (i.e. in such a way that the membrane (133) is illuminated), and back-lighting of the concave mirror array if it is partially silvered (that is, if some light is able to pass through the reflective concave surface (136)). It also shows that a liquid crystal display (LCD) panel may be used as the membrane (133) inside the auto-multiscopic 3D display. For example, this can occur if the auto-multiscopic 3D display is backlit and the reflective concave surface (136) of the concave mirror array (800) is partially silvered, thus enabling light from a backlight to pass through the reflective concave surface (136) and illuminate the membrane (133), which, in this example, could be an LCD panel that would ideally be adjacent to the second-side (132) of the parallax barrier (130), which would preferably be colored white.

In this example where the LCD panel is used as the membrane (133), the LCD panel preferably contains an array of second transparent spots or an array of second transparent lines (ideally formed with clear sub-pixels in the LCD panel) that correspond with the array of first transparent spots (1005) or the array of first transparent lines (1105) respectively in the parallax barrier (130). Optionally, light from the backlight is prevented from traveling directly through each apex (237) in the plurality of concave mirrors (135) and out of the parallax barrier (130) by locating opaque spots or lines on each apex (237). Also, in this case, white light would be able to approach each first transparent spot (120) or each first transparent line (1106) in the parallax barrier (130) along trajectories that are not perpendicular to the first-side (131) or the second-side (132) of the parallax barrier (130). This white light would mix with image-related light that approaches the concave mirror array (800) from the membrane (133) and is reflected towards the array of first transparent spots (1005) or towards the array of first transparent lines (1105) in the parallax barrier (130), enabling this light to exit the display. The resulting net image will thus exhibit some variations in brightness, but should not be as jumbled for a viewer (150) as if the backlight was emitting a complex colored light image (such as an array of elemental images) rather than white light.

An LCD panel acting as a membrane (133) may alternately be illuminated by a light source located inside the parallax barrier. In this case, the LCD panel would have to contain an array of second transparent spots or second transparent lines (ideally formed from clear sub-pixels in the LCD panel) that correspond with first transparent spots or first transparent lines respectively in the parallax barrier, thus enabling image related light to exit the display.

In an alternate example, a transparent OLED display and an opaque parallax barrier layer may be coupled together to function as the parallax barrier (130) that contains the array of first transparent spots (1005) or the array of first transparent lines (1105). To accomplish this, an opaque parallax barrier layer could either be painted onto one face of the transparent OLED display or located within the volume of the transparent OLED display, very close to its light emitting regions. An array of transparent spots or lines formed by clear sub-pixels would be maintained in the transparent OLED display during its operation, which would be aligned with a corresponding array of transparent spots or lines in the opaque parallax barrier layer, thus forming in combination an array of first transparent spots (1005) or an array of first transparent lines (1105) in the parallax barrier (130). In operation of the auto-multiscopic 3D display, the transparent OLED display would emit white light. An LCD screen, with a corresponding array of second transparent spots or second transparent lines formed by clear sub-pixels in the LCD screen, could then be placed adjacent to the light emitting face of the parallax barrier (130), thereby functioning as the membrane (133). This membrane would be capable of displaying the intrinsic image (1650) when illuminated by the light emitting face of the parallax barrier (130), which would function as a white light source.

The left column of FIG. 14 clarifies that it is within the scope of the invention to have an image printed on the inner layer of the parallax barrier. FIG. 14 says "printed image on a surface," which allows for the surface to either be the parallax barrier (130) or another separate item like a sheet of paper.

One application of this configuration is that it enables straightforward display of auto-multiscopic 3D images based on drawings and prints. In such a case, the parallax barrier and the image sheet (i.e. the membrane) could then be combined into a single, optionally portable sheet. For example an opaque sheet that is black on one side and has an array of elemental images printed on its other side (i.e. the intrinsic image (1650)), and an array of pinholes passing through it, could be used in a manner similar to how a transparency sheet on a typical overhead projection display is used. That is, one or more opaque sheets with arrays of elemental images printed on one side could be stored separately from the lamp and concave mirror array portions of the display. This would do away with the need to maintain a separate lighting source for each opaque sheet, if only one opaque sheet at a time is viewed with the illumination provided by the lamp and concave mirror array portions of the display.

The right column of FIG. 14 shows that the membrane in an auto-multiscopic 3D display may also be used exclusively to display a white light image (or alternately an image comprised of light of another color). In such a case, the membrane would help to facilitate the emission of a structured pattern of light into the space in front of the display. In this illustrated instance, this structured pattern of light is then used to facilitate auto-multiscopic 3D image display with the use of a colored image sheet (shown with an array of elemental images on it) located in front of the parallax barrier. The colored image sheet in this case is an add-on to the core image capture/display system, which requires the membrane to be between the first-side of the parallax barrier and the concave mirror array. Ambient light could interfere with the appearance of portions of this colored image sheet located in front of the parallax barrier (130), since the surface of this colored image sheet located in front of the parallax barrier (130) would be directly visible to a viewer (150) of the display. In other exemplary instances, the structured pattern of light emitted by such a display may be used to facilitate novel indoor or outdoor lighting effects.

Additionally, a membrane that displays a white light image (i.e. emits white light) may be used to illuminate a colored image sheet that is adjacent to the membrane (133) and located in between the parallax barrier and the concave mirror array, thus facilitating the display of an auto-multiscopic 3D image. This colored image sheet would effectively form another layer of the membrane (133) if adjacent to it, and would contain a pattern of transparent spots or lines that are aligned with the corresponding transparent spots or lines on both the white-light-emitting layer of the membrane (which may be a transparent OLED display, for example) and the parallax barrier (130). It is noted for the sake of completeness that such an additional colored image sheet is included within the scope of the embodiment, described above, that includes the first transparent solid (406) between the membrane (133) and the concave mirror array (800). Therefore, the colored image sheet would not necessarily need to be directly adjacent to the white-light-emitting layer of the membrane (thus forming another layer of the membrane) in all display embodiments.

Additionally, the membrane (133) that displays an array of colored elemental images may be used to project light towards the concave mirror array (800). As an example, a transparent OLED display that maintains an array of transparent sub-pixels aligned with the array of first transparent spots (1005) or the array of first transparent lines (1105) in the parallax barrier (130) could be used as the membrane (133) for this purpose.

Example 4

FIG. 15 illustrates an alternative configuration using a partially-silvered concave mirror array, that is, a concave mirror array that both reflects light and allows light to pass through it. In this alternative configuration, a concave lens array (1501) is placed on the side of the concave mirror array (800) that is opposite the side having the reflective concave surface (136). In operation of the display, the concave mirror array causes originally parallel light rays emitted by the membrane (133) to converge on real focal points or real focal lines (1502) of the display, and then subsequently exit the display, while the concave lens array (1501) causes originally parallel light rays emitted by the membrane (133) to appear (i.e. on the side of the display with the concave lens array) to diverge from virtual focal points or virtual focal lines. Thus, in this configuration, the surface of the membrane (133) can be seen through the concave lens array (1501) by the viewer (150), who faces the side of the display with the concave lens array. If portions of the membrane (133) are transparent or translucent, or the membrane (133) is an intrinsic image (1650) on the second-side (132) of the parallax barrier (133), then the second-side (132) of the parallax barrier may also be visible to a viewer (150) who faces the side of the display with the concave lens array.

Thus, on the viewer side (1502), the apparatus (100) can display an array of elemental images each obtained by first collimating converging light rays and then capturing the collimated light rays on an image sensor. Alternately, on the side with the concave lens array (1501), it can display an array of elemental images each obtained by first collimating diverging light rays and then capturing the collimated light rays on an image sensor (as in the FIG. 12 and FIG. 13 devices, for example). Both of these image capture processes may also be simulated with the aid of a computer, to produce arrays of entirely artificial elemental images. On the side with the concave lens array, the display would ideally be viewed in low ambient light conditions because of the likely partial reflectivity of the convex side of the concave mirror array underneath it. Although an auto-multiscopic 3D display consisting solely of a concave lens array overlaying a light emitting membrane would avoid this particular issue with the reflectivity of the convex side of the concave mirror array, ambient light could still reflect off the surface of the concave lens array in such a display, causing unwanted glare in the displayed images.

In operation of this display, the membrane (133) may be a transparent OLED display on which an array of transparent spots is maintained that aligns with the array of transparent spots in the parallax barrier. The transparent OLED display may display colored elemental images that emit light towards the concave mirror array. In operation of this display, the membrane (133) may alternately be a transparent OLED display on which an array of transparent lines is maintained that aligns with the array of transparent lines in the parallax barrier.

Black/clear LCD panels could be used near both faces of the display to prevent light from exiting one face when the other face is being used. In an alternate embodiment, an LCD panel is used as a parallax barrier (130).

In the case of an auto-multiscopic 3D display in which light exits the parallax barrier (130) through transparent spots, each individual transparent spot may be made to emit light of a homogenous color, thus enabling the display to show a 2D image (in which each transparent spot plays a role analogous to that of a traditional pixel on a 2D display).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the television and theater industry.

What is claimed is:

1. An apparatus to display or capture auto-multiscopic 3D images, the apparatus comprising:
a concave mirror array comprising a plurality of concave mirrors, wherein each concave mirror in a plurality of concave mirrors:
has a reflective concave surface; and
has a focal point or a focal line;
a parallax barrier comprising:
a first-side facing a viewer, wherein the first-side of the parallax barrier is opaque;
a second-side facing the reflective concave surface of each concave mirror in the plurality of concave mirrors in the concave mirror array;
when the concave mirror array comprises the plurality of concave mirrors with a focal point, then:
the parallax barrier further comprises an array of first transparent spots extending through the parallax barrier; and
the array of first transparent spots comprises a first transparent spot for each concave mirror in the plurality of concave mirrors having the reflective concave surface;

when the concave mirror array comprises the plurality of concave mirrors with a focal line, then:
the parallax barrier further comprises an array of first transparent lines extending through the parallax barrier; and
the array of first transparent lines comprises a first transparent line for each concave mirror in the plurality of concave mirrors; and
a membrane comprising a surface, the membrane situated between the first-side of the parallax barrier and the concave mirror array;
the membrane situated at a fixed distance from the concave mirror array;
the membrane configured with a capability selected from the group consisting of displaying an intrinsic image when illuminated, sensing a projected image on the membrane, displaying a projected image on the membrane, emitting light, and a combination of any of these capabilities;
when the concave mirror array comprises the plurality of concave mirrors with a focal point, then:
the membrane comprises a second transparent spot for each focal point in at least a plurality of focal points from the concave mirror array; and
each second transparent spot is located near one focal point in said plurality of focal points;
when the concave mirror array comprises the plurality of concave mirrors with a focal line, then:
the membrane comprises a second transparent line for each focal line in at least a plurality of focal lines from the concave mirror array; and
each second transparent line is located near one focal line in said plurality of focal lines.

2. The apparatus of claim 1, further comprising a light source configured with a capability selected from the group consisting of: illuminating the membrane, and projecting an image on the membrane.

3. The apparatus of claim 1, wherein the reflective concave surface is configured to be partially reflective so as to enable light to pass through the reflective concave surface and be reflected back off the reflective concave surface.

4. The apparatus of claim 3, further comprising a concave lens array situated on a side of the concave mirror array opposite to the reflective concave surface.

5. The apparatus of claim 1:
wherein each concave mirror in the concave mirror array is defined by an apex;
when the concave mirror array comprises the plurality of concave mirrors with a focal point, then an opaque spot is located at the apex of each such concave mirror; and
when the concave mirror array comprises the plurality of concave mirrors with a focal line, then an opaque line is located at the apex of each such concave mirror.

6. The apparatus of claim 1:
wherein each concave mirror in the concave mirror array is defined by an apex;

when the concave mirror array comprises the plurality of concave mirrors with a focal point, then a third transparent spot is located at the apex of each concave mirror in the concave mirror array; and
when the concave mirror array comprises the plurality of concave mirrors with a focal line, then a third transparent line is located at the apex of each concave mirror in the concave mirror array.

7. The apparatus of claim 6, wherein each concave mirror in the plurality of concave mirrors in the concave mirror array is configured with a convex surface, the convex surface being on a side of the concave mirror array opposite to the reflective concave surface; the apparatus further comprising a display on the side of the concave mirror array with the convex surface.

8. The apparatus of claim 1, further comprising a transparent gas occupying a volume between the concave mirror array and the parallax barrier.

9. The apparatus of claim 1, further comprising a first transparent solid occupying a volume between the concave mirror array and the parallax barrier.

10. The apparatus of claim 1, further comprising a transparent liquid occupying a volume between the concave mirror array and the parallax barrier.

11. The apparatus of claim 1:
wherein each concave mirror in the plurality of concave mirrors in the concave mirror array is configured with a convex surface, the convex surface being on a side of the concave mirror array opposite to the reflective concave surface;
wherein each concave mirror in the plurality of concave mirrors in the concave mirror array is configured to be partially reflective so as to enable a portion of light to pass through the reflective concave surface; and
the apparatus further comprising a second transparent solid located adjacent to the convex surface.

12. The apparatus of claim 1:
wherein the plurality of concave mirrors is configured with a convex surface, the convex surface being on a side of the concave mirror array opposite to the reflective concave surface;
wherein each concave mirror in the plurality of concave mirrors in the concave mirror array is configured to be partially reflective so as to enable a portion of light to pass through the reflective concave surface; and
the apparatus further comprising an image sensor on the same side of the concave mirror array as the convex surface.

13. The apparatus of claim 12, wherein the image sensor is selected from the group consisting of a complementary metal-oxide semiconductor (CMOS) chip, a charge-coupled device (CCD) chip, a film positive, and a film negative.

14. The apparatus of claim 12, further comprising a second transparent solid situated on the convex surface of the concave mirror array.

* * * * *